Oct. 13, 1959 P. J. HALS 2,908,774
CATHODE-FOLLOWER FOR PULSE OPERATION
Filed Sept. 16, 1955
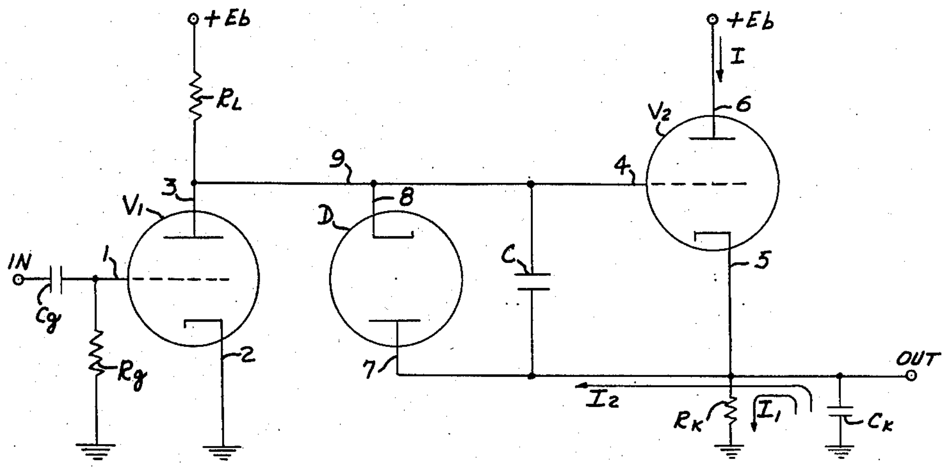
Fig-I
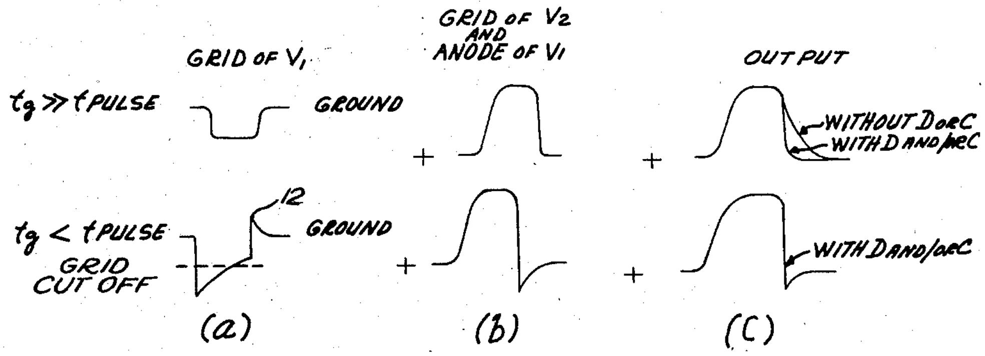
Fig-2
INVENTOR.
PER JAHRMANN HALS
BY Wade Koontz
Donald C Keaveney
ATTORNEYS United States Patent Office 2,908,774
Patented Oct. 13, 1959

2,908,774

CATHODE-FOLLOWER FOR PULSE OPERATION

Per Jahrmann Hals, Oslo, Norway, assignor to the United States of America as represented by the Secretary of the Air Force Application September 16, 1955, Serial No. 534,896
2 Claims. (Cl. 179—171)

This invention relates to apparatus for decreasing the decay time constant and the tube current of the cathode-follower output stage of a plural stage pulse amplifier used to drive a capactive load.

It has been found that connecting a diode or a capacitor between the cathode and the grid of a cathode-follower used in the output stage of a pulse amplifier will provide an additional discharge path for any capacitive load, thus substantially decreasing the decay time of the output pulse as well as decreasing the power supply drain and tube current. The capacitive load may be cable, stray or any other type of capacitance. In the case where the amplifier feeds an output cable, for example, it is not always expedient to properly terminate the cable so as to eliminate its input capacity in order to permit proper pulse shaping. The present invention affords one means of achieving good pulse shaping action and low tube drain even though the amplifier is working into a capacitive load.

It is, therefore, an object of the present invention to provide a plural stage pulse amplifier having a cathode-follower output stage with low tube drain and a small decay time constant.

Other objects and advantages will be apparent to those skilled in the art from the following specification taken in conjunction with the drawings wherein:

Figure 1 is a circuit diagram of the amplifier.

Figure 2 (*a, b, c*) is a diagrammatic view of the wave forms at three different points in the circuit of Figure 1.

Turning now to drawings, Figure 1 shows the circuit for the simplest case, that is, for positive pulses. $V_1$ is an amplifier tube with zero or positive bias. Connected to the grid 1 of tube $V_1$ are a grid resistor $R_g$ and a coupling condenser $C_g$ by means of which input pulses from previous stages may be coupled to the tube $V_1$. The network consisting of $C_g$ and $R_g$ has a time constant $t_g=R_gC_g$ which is normally chosen to be greater than the period $t$ of the input pulses, resulting in the wave-form shown in the upper part of Figure 2. The cathode 2 of tube $V_1$ is connected to ground as is the other end of resistor $R_g$. Connected to the anode 3 of tube $V_1$ is a load $R_L$ the other end of which is connected to a source of fixed positive potential $+E_b$. The anode 3 of tube $V_1$ is also directly connected, as by lead 9, to the grid 4 of the cathode-follower tube $V_2$. The anode 6 of tube $V_2$ is directly connected to a source of fixed positive potential $+E_b$. The cathode 5 of $V_2$ is connected to ground through the cathode resistor $R_k$. The cathode-follower $V_2$ feeds into the capacitive load $C_k$ which is connected in shunt across $R_k$ and which may be cable, stray, or any other type of capacitance.

The components described above constitute the conventional cathode-follower output stage. The present invention consists of connecting the diode D, or the capacitor C, or both of these latter elements, directly between the grid 4 and the cathode 5 of tube $V_2$. For a positive pulse output the diode D would have its anode 7 connected to the junction point of $R_k$ and the cathode 5 of tube $V_2$ and would have its cathode 8 directly connected to the grid 4 of tube $V_2$ as shown in Figure 1.

To more clearly understand the operation of the circuit, consider first the conventional cathode-follower without diode D or capacitor C connected. The maximum steepness of the front edge of the output pulse as seen in part *c* of Figure 2, is determined by the cathode-follower action of $V_2$ giving an approximate charging time constant $$t_{ch}=\frac{1}{gm}C_k$$

The minimum decay time of the pulse, however, will in general be determined by the time constant $t_{dis}=C_kR_k$, as the input in general will be large and steep enough to cut $V_2$ off during the negative going edge of the pulse. That is to say, $C_k$ can not discharge instantaneously and therefore the cathode can not immediately follow the negative swing of the grid. Therefore, $R_k$ will usually have to be chosen small for steep pulses, and the current $$I=\frac{E}{R_k}$$

will be quite large. Class A operation may be used, reducing the decay time constant but again the current I into $V_2$ will be even larger. It will be noted, therefore, that to reproduce a negative going steep slope of the pulse by the conventional cathode-follower will require a sizeable current I from the power supply through the tube $V_2$.

However, connecting diode D as shown in Figure 1 will introduce a substantial saving in current drain I. Ignoring capacitor C for the moment, the operation is as follows. When there are no pulses coming from tube $V_1$, grid and cathode of $V_2$ are at the same potential. During the rise and flat portion of the pulse the diode D will be non-conducting since its cathode 8 will be positive with respect to its anode 7. During the decay time, however, the diode D will provide a path for the discharge current $I_2$ from $C_k$ through diode D and through the previous stage. The impedance of the previous stage at this time is fairly low since $V_1$ is fully conducting. That the diode D will conduct during the decay time may be seen by considering that the positive potential built up across $C_k$ during the flat portion of the pulse cannot change instantaneously during the negative going edge of the pulse applied to grid 4 of tube $V_2$. Consequently until $C_k$ is discharged, anode 7 of the diode D is positive with respect to its cathode 8 and the diode will conduct. This gives a rapid discharge of the condenser $C_k$, the discharge time constant now being $t=C_k\times(R_k$ in parallel with diode D plus the previous stage impedance). This operation would be true even without the presence of the condenser C in parallel with the diode D.

For moderate values of $C_k$ and of pulse amplitudes, the discharge current $I_2$ will be enough to give the necessary decay. $R_k$ may then be chosen independently of decay time and hence $R_k$ may be made rather large, or omitted altogether leaving only the high impedance due to stray capacitance from cathode to ground in shunt with the condenser $C_k$. The current drain from the power supply in that case will be only the charging current to $C_k$ during the front edge of the pulse. This represents a considerably reduced current compared to the normal cathode-follower requirement.

It will be seen that the same considerations which apply to the positive pulses discussed above also apply to negative pulses and to condenser coupling between tubes $V_1$ and $V_2$ with the appropriate bias conditions.

The same type of operation as given by the diode D alone may, to a certain extent, be obtained by connecting a capacitor C instead of the diode D from the grid 4 to the cathode 5 of tube $V_2$. The operation may be understood as follows. The effective input capacity of $V_2$ is known to be $C_{eff}=C(1-A)$ where A is the gain of $V_2$. If A is made close to unity, as is usual in the cathode-follower stage, $C_{eff}$ is very small and hence the resulting large input impedance will not load down the pulse from $V_1$ noticeably. Any influence on the pulse rise time may be taken care of by reducing $R_L$. Hence the condenser C may be chosen to provide an impedance low as compared to $R_k$ during the decay time for the discharge current $I_2$, thus shortening the decay time of the output pulse. As before, the current drain in $V_2$ will be reduced. When diode D is used its unilateral impedance properties are relied upon to provide a discharge path having an impedance low by comparison with $R_k$. When capacitor C is used it is chosen large enough to also provide such a low impedance discharge path, and its relation to the effective tube input capacity $C_{eff}=C(1-A)$ is relied upon, to provide the desired high impedance during the charging time of $C_k$.

Both elements C and D may, of course, be used at the same time as shown in Figure 1. The operation of the elements D and C when both are used is substantially the same as outlined above for independent operation. D and C merely tend to supplement each other when both are used. It should be understood, however, that either element D or C alone will provide satisfactory operation.

The operation described above assumes that $C_g$ and $R_g$ are so chosen that their time constant $t_g$ is large in comparison to the period $t$ of the pulse to produce the waveform shown in the upper part of Figure 2. By choosing the time constant $t_g=R_gC_g$ of the grid circuit of tube $V_1$ less than the pulse length $t$, the grid of the tube $V_1$ may be driven positive for an instant as shown at 12 in the lower waveforms of Figure 2. The positive swing of the grid of $V_1$ increases the discharge current $I_2$ and consequently further decreases the decay time constant $t_k$. This type of operation, however, tends to produce undershoot in the pulse waveforms as may be seen in Figure 2. This may be controlled by known methods, e.g., diode limiter.

There has been described a novel, inexpensive and improved amplifier system for driving a capacitive load which system minimizes the current drain from the power supply and faithfully reproduces the driving signal wave shape. It is understood that the embodiment of the invention described above is illustrative only and that the invention embraces all equivalent apparatus falling within the spirit and scope of the following claims.

What I claim is:

1. A system for delivering rapidly terminating pulses to a capacitive load comprising a driver stage and a cathode follower output stage, each stage including an electronic discharge tube having a cathode, a control grid, and an anode, a resistor connected between the anode of the driver stage and a source of positive potential, a low impedance connection between the anode of the output stage and a source of positive potential, said cathode of said driver stage being directly connected to ground, there being a capacitive load connected between the cathode load terminal of the output stage and ground, a coupling connection for applying control pulse waveforms to the control grid of the driver stage, a low impedance connection between the anode of the driver stage and the control grid of the output stage, and a diode connected in conducting relation between the cathode load terminal of the output stage and the anode of the driver stage whereby the diode and the driver stage form a series circuit connected in shunt with the capacitive load.

2. A pulsing system for delivering a rapidly decaying pulse to a high resistance capacitive load comprising a controlled driver stage, a grounded cathode in said driver stage, a cathode follower output stage, a cathode output terminal in said output stage, said output terminal being directly connected to the capacitive load, a control grid in said driver stage, a pulse control circuit connected to said grid in said driver stage, a control grid in said output stage, a low impedance connection from the anode of the driver stage to the control grid of the output stage whereby said output stage is fully conducting when said driver stage is non-conducting and means for rapidly terminating current flow through said output stage in response to conduction in said driver stage, said means including a diode connected in conducting relation from the cathode output terminal of said output stage to the anode of the driver stage whereby the load capacitance is discharged through the diode and the driver stage.

References Cited in the file of this patent

UNITED STATES PATENTS

| | | |
|---|---|---|
| 2,240,600 | Applegarth | May 6, 1941 |
| 2,240,601 | Applegarth | May 6, 1941 |
| 2,241,553 | Kallmann et al. | May 13, 1941 |

FOREIGN PATENTS

| | | |
|---|---|---|
| 682,864 | Great Britain | Nov. 19, 1952 |
| 152,023 | Australia | June 24, 1953 |
| 694,531 | Great Britain | July 22, 1953 |
| 153,275 | Australia | Sept. 18, 1953 |
| 717,217 | Great Britain | Oct. 20, 1954 |